(12) United States Patent
Peixoto et al.

(10) Patent No.: US 10,078,714 B2
(45) Date of Patent: Sep. 18, 2018

(54) DATA PROPAGATION ANALYSIS FOR DEBUGGING A CIRCUIT DESIGN

(71) Applicants: Fabiano Peixoto, Belo Horizonte (BR); Breno Rodrigues Guimaraes, Minas Gerais (BR); Xiaoyang Sun, Shanghai (CN); Claudionor Coelho, Jr., Menlo Park, CA (US)

(72) Inventors: Fabiano Peixoto, Belo Horizonte (BR); Breno Rodrigues Guimaraes, Minas Gerais (BR); Xiaoyang Sun, Shanghai (CN); Claudionor Coelho, Jr., Menlo Park, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 147 days.

(21) Appl. No.: 15/033,643

(22) PCT Filed: Oct. 31, 2013

(86) PCT No.: PCT/CN2013/086294
§ 371 (c)(1),
(2) Date: Apr. 30, 2016

(87) PCT Pub. No.: WO2015/062013
PCT Pub. Date: May 7, 2015

(65) Prior Publication Data
US 2016/0283628 A1  Sep. 29, 2016

(51) Int. Cl.
*G06F 9/455* (2018.01)
*G06F 17/50* (2006.01)

(52) U.S. Cl.
CPC ...... *G06F 17/5031* (2013.01); *G06F 17/5045* (2013.01); *G06F 17/5059* (2013.01); *G06F 2217/62* (2013.01); *G06F 2217/84* (2013.01)

(58) Field of Classification Search
USPC ....................................................... 716/108
See application file for complete search history.

(56) References Cited

U.S. PATENT DOCUMENTS 7,877,710 B1 * 1/2011 Neto ................. G06F 17/5036
716/100
2002/0186247 A1  12/2002 Ohkubo
(Continued)

FOREIGN PATENT DOCUMENTS

JP  2003216672 A  7/2003

OTHER PUBLICATIONS

PCT International Preliminary Report on Patentability for International Appln. No. PCT/CN2013/086294, Applicant Jasper Design Automation, Inc., dated May 12, 2016 (6 pages).
(Continued)

*Primary Examiner* — Bryce Aisaka
(74) *Attorney, Agent, or Firm* — Vista IP Law Group, LLP (57) ABSTRACT

A method for data propagation analysis. A data propagation diagram for a circuit design is generated. The data propagation diagram includes a plurality of nodes and a plurality of edges connecting the nodes. The nodes represent data locations in the circuit design and the edges represent data propagation paths between the data locations in the circuit design. A signal trace specifying signal values for the circuit design is analyzed to determine whether data at a first data location of the data locations during a first clock cycle is causally related to the data at a second data location of the data locations during a second clock cycle. A visual animation is displayed on the data propagation diagram indicating movement of the data between a first node of the nodes corresponding to the first data location and a second node of the nodes corresponding to the second data location.

20 Claims, 11 Drawing Sheets

(56) References Cited

U.S. PATENT DOCUMENTS

2006/0143587 A1\* 6/2006 Boutin .................. G06F 17/509
   716/119
2011/0078644 A1 3/2011 Manohar et al.

OTHER PUBLICATIONS

PCT International Search Report for International Appln. No. PCT/CN2013/086294, Applicant Jasper Design Automation, Inc., dated Aug. 4, 2014 (3 pages).

\* cited by examiner

DATA PROPAGATION ANALYSIS FOR DEBUGGING A CIRCUIT DESIGN

BACKGROUND

1. Field of the Disclosure

The present disclosure relates generally to analysis of circuit designs, and more particularly to data propagation analysis for debugging circuit designs.

2. Description of Related Art

As the complexity in circuit design has increased, there has been a corresponding need for improvements in various kinds of analysis and debugging techniques. In fact, these analysis and debugging techniques have evolved from relatively simple transistor circuit-level simulation (in the early 1970s) to logic gate-level simulation (in the late 1980s) to the current art that uses Register Transfer Language (RTL)-level simulation, and formal verification. RTL describes the registers of a computer or digital electronic system and the way in which data are transferred among the combinational logic between registers.

Existing verification and debugging tools are used in the design flow of a circuit. The design flow begins with the creation of a circuit design at the RTL level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical tools to create a HDL-based design.

Conventional verification tools generate large amounts of data, such waveforms that are displayed to a circuit designer. As design complexity increases, it becomes harder and harder for circuit designers analyzing these waveforms to comprehend the activities exercised in the circuit design, since it involves looking at thousands of signals and thousands of cycles. One example of this complexity is in the analysis of a deadlock error in a system on chip (SoC) design. A waveform showing a deadlock would include activities in many circuit components interacting through an off-chip network or network on a chip, and understanding why the deadlock occurs by looking at each of the many signals and cycles in the waveform would be unproductive.

SUMMARY

Embodiments of the disclosure include methods and non-transitory computer readable media for analyzing and visualizing data propagation in a circuit design. Movement of data across the circuit design can be animated on a data propagation diagram that represents a high-level view of a circuit design. A circuit designer viewing the animations can then visually follow data as it enters the circuit design, propagates to different data locations in the circuit design, and stalls or exits the circuit design, all without bogging down the circuit designer with unnecessary low-level details of the circuit design.

In one embodiment, the method comprises generating a data propagation diagram for a circuit design. The data propagation diagram includes a plurality of nodes and a plurality of edges connecting the nodes. The nodes represent data locations in the circuit design and the edges represent data propagation paths between the data locations in the circuit design. The method also comprises analyzing a signal trace specifying signal values for the circuit design to determine whether data at a first data location of the data locations during a first clock cycle is causally related to the data at a second data location of the data locations during a second clock cycle. The method further comprises, responsive to determining that the data at the first data location is causally related to the data at the second data location, displaying a visual animation on the data propagation diagram indicating movement of the data between a first node of the nodes corresponding to the first data location and a second node of the nodes corresponding to the second data location. In one embodiment, the computer readable medium includes code comprising instructions for performing the method.

BRIEF DESCRIPTION OF THE DRAWINGS

The teachings of the embodiments disclosed herein can be readily understood by considering the following detailed description in conjunction with the accompanying drawings.

DETAILED DESCRIPTION

The figures and the following description depict various embodiments of the present invention for purposes of illustration only. One skilled in the art will readily recognize from the following discussion that alternative embodiments of the structures and methods illustrated herein may be employed without departing from the principles of the invention described herein. Reference will now be made in detail to several embodiments, examples of which are illustrated in the accompanying figures. It is noted that wherever practicable similar or like reference numbers may be used in the figures and may indicate similar or like functionality.

System for Data Propagation Analysis

Figure 1:
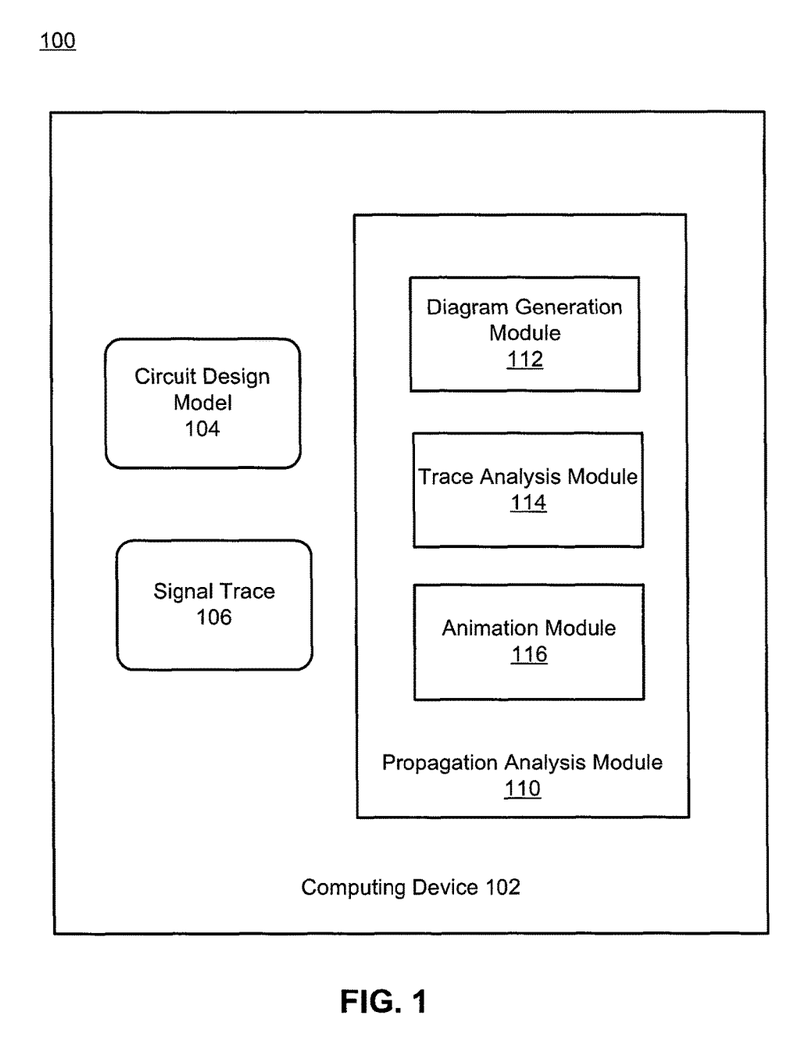
FIG. 1 illustrates a system for data propagation analysis of a circuit design, according to an embodiment.

FIG. 1 illustrates a system 100 for data propagation analysis of a circuit design, according to an embodiment. The system 100 includes a computing device 102. Computing device 102 can be a computer that includes a processor, non-transitory storage medium (e.g. hard disc drive, solid state drive) and a display. Computing device 102 includes a circuit design model 104, a signal trace 106, and a circuit design analysis module 102, which may be stored in the non-transitory storage medium of the computing device 102.

Circuit design model 104 is a model of a circuit design that describes the components and/or behaviors of the circuit design. Circuit design model 104 can be a register transfer level (RTL) description of the circuit design that is specified according to a Hardware Description Language (HDL), such as Verilog HDL or VHDL. Signal trace 106 includes signal values for many signals of the circuit design over many clock cycles. Signal trace 106 can be generated from a simulation of the circuit design model 104. Alternatively, signal trace 106 can be generated from formal verification as a counterexample showing the violation of an assertion property, or a trace showing how a coverage point can be exercised.

Propagation analysis module 110 uses the circuit design model 104 and the signal trace 106 to generate a user interface with animations that visualize how data propagates through the circuit design. The animations are presented in a manner that allows a circuit designer to easily understand and debug the behavior of the circuit design. Propagation analysis module 110 includes a diagram generation module 112, a trace analysis module 114, and an animation module 116. In other embodiments, there may be a different number of modules than that shown in FIG. 1, and the functionality attributed to one module may instead be performed by a different module.

Diagram generation module 112 receives the circuit design model 104 and generates a data propagation diagram from the circuit design model 104. A data propagation diagram is a visual representation of possible locations in the circuit design where valid data may be located during operation of the circuit design, as well as paths for data propagation between the locations. The data propagation diagram is a high-level view of data flow that appears simpler than a schematic representation of the circuit design and can omit detailed information about individual circuit elements (e.g. flops, gates, circuit elements) of the circuit design that would otherwise distract a circuit designer.

Figure 2:
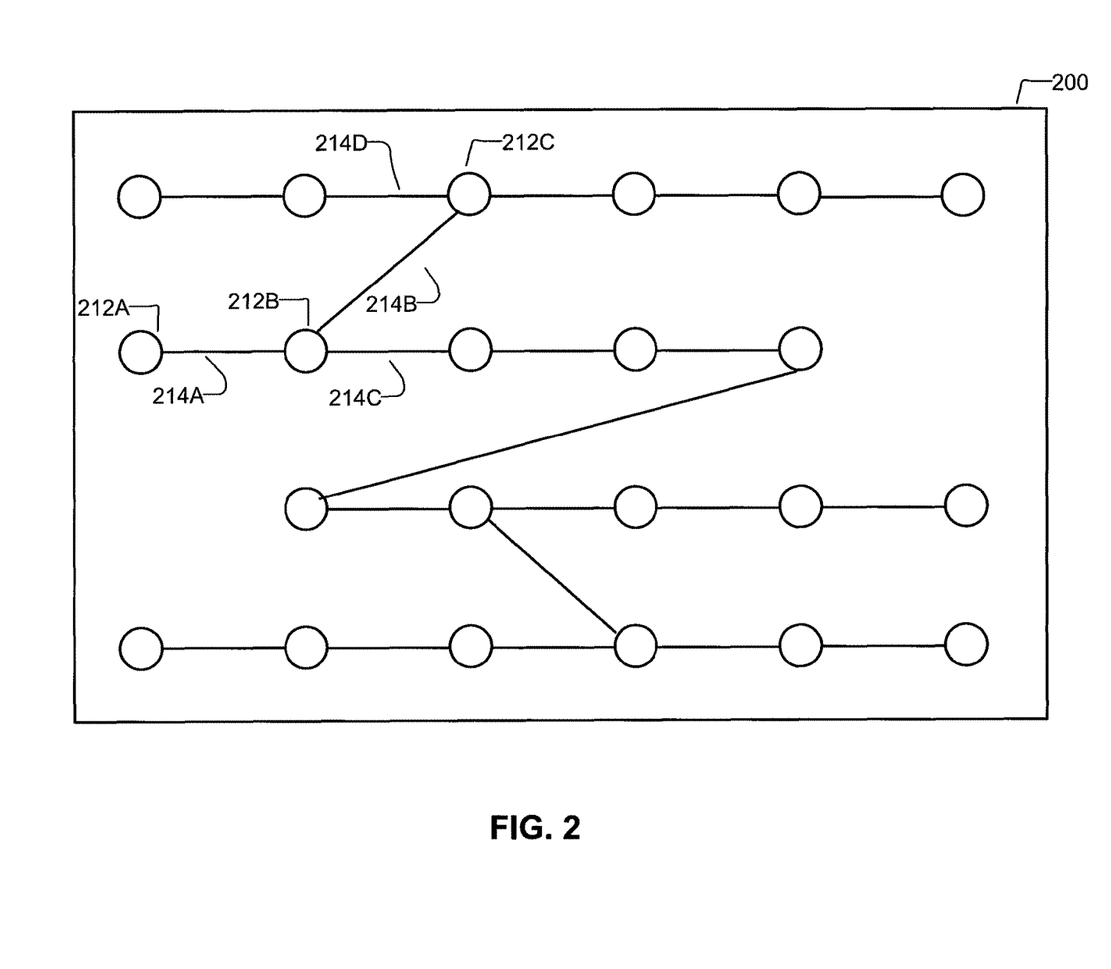
FIG. 2 illustrates a data propagation diagram according to one embodiment.

Referring now to FIG. 2, illustrated is a data propagation diagram 200 generated by the diagram generation module 112, according to one embodiment. This data propagation diagram 200 is a graph-like representation of a circuit design that includes nodes 212 and edges 214 connecting the nodes 212. Each node 212 represents a data location in the circuit design where data can be located. For example, each node 212 may represent a different register in the circuit design. Additionally, if the circuit design includes discrete modules, the nodes 212 may represent signal boundaries between the modules. The edges 214 represent data propagation paths in the circuit design through which data can propagate from one location to another. For example, the data propagation paths may include signal wires, combinational logic, or other logic that exists between data locations. Each edge 214 connects a pair of nodes 212. For example, edge 214A connects node 212A and 212B.

Some nodes 212 may have more than one edge leading out of the node 212. For example, there are two edges 214B and 214C leading out of node 212B. This means that data can propagate out from the data location corresponding to node 212B to more than one other data location in the circuit design. Some nodes 212 may have more than one edge leading into the node 212. For example, there are two edges 214B and 214D leading into node 212C. This means that data can propagate into the data location corresponding to node 212C from more than one other data location in the circuit design.

In the data propagation diagram 200, the nodes 212 are shown as hollow circles and the edges 214 are shown with straight lines. In other embodiments the nodes 212 can have a different appearance than that shown in FIG. 2. For example, the nodes 212 can have a different shape, have shading, have color, etc. The edges 214 can also have a different appearance than that shown FIG. 2. For example, the edges 214 can be curved lines, dotted lines, arrows pointing in a direction of data propagation, etc.

In one embodiment, the diagram generation module 112 receives information explicitly describing source locations and destination locations and uses these locations in generating the data propagation diagram 200. Source locations are portions of the circuit design that can be a source of data for other portions of the circuit design. For example, the source locations can be input ports of a circuit design or registers near the input ports of the circuit design. Destination locations are portions of the circuit design that can be a destination for data passing through the circuit design. For example, the destination locations can be output ports of a circuit design or registers near the output ports of the circuit design.

The diagram generation module 112 searches forwards from the source locations to identify other locations that data from the source data locations can propagate to. The diagram generation module 112 searches backwards from the destination locations to identify additional locations that data in the destination locations can come from. The source locations may be used for the beginning points of the diagram (e.g., the leftmost nodes in FIG. 2) and the destination locations are used for the endpoints of the diagram (e.g., the rightmost nodes in FIG. 2).

When searching forward from the source locations or backwards from the destination locations, the diagram generation module 112 separates data paths from control paths. Only locations in the data paths are used in generating the data propagation diagram 200 whereas locations in the control path are not used in generating the data propagation diagram 200. Once a location is classified as a data location in a data path, the circuit design can be traced backwards from the data location (e.g., through driving gates) or forwards from the data location (e.g. through gates driven by the data location) to determine more data locations.

For example, multiple bit inputs to a multiplexer (MUX) and the output of a MUX are considered data locations that are part of a data path. On the other hand, the select input to the MUX is part of the control path. In specific, assume there is Verilog code of "always@(posedge clk) if (data_valid) q<=data;" which defines a MUX having an input of "data", a select input of "data_valid" and an output connected to a register "q". The multiple bit input "data" and the register "q" can be classified as data locations within the data path. The select input of "data_valid" is classified as a control path. As another example, a multi-bit input of a comparator that is compared to a constant is usually considered part of the control path, typically used to store the state of a finite state machine. In specific, assume there is Verilog code of "always@(posedge clk) if (q==3'b110)q<=3'b100", which defines a comparator comparing multi-bit input "q" to the value of 110. The multiple bit input q is considered storage for a finite state machine and part of the control path.

Figure 3:
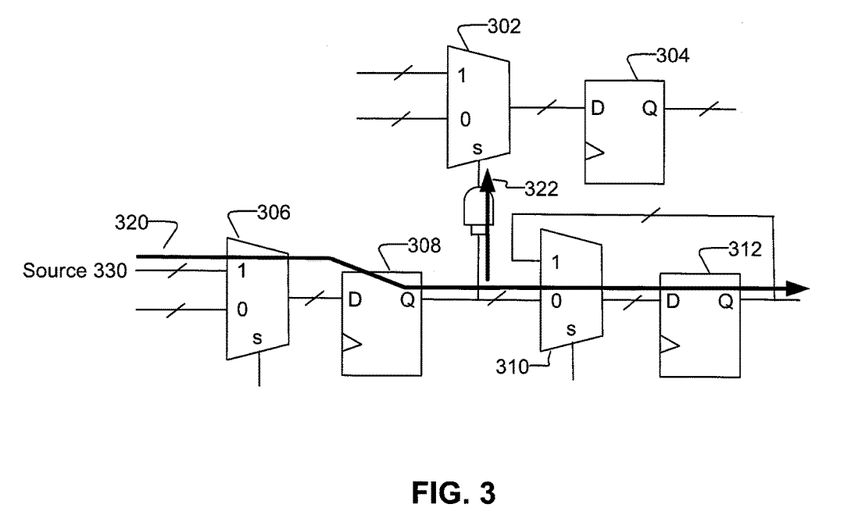
FIG. 3 illustrates an example of converting a circuit design into a data propagation diagram, according to an embodiment.

Referring to FIG. 3, illustrated is an example of converting a circuit design into a data propagation diagram, according to an embodiment. The circuit design includes a MUX 302, register 304, MUX 306, register 308, MUX 310 and register 312. MUXes are routing control circuits that control data flow for multi-bit data depending on a state of a selection control input to the MUX. In FIG. 3, the "1" data input of MUX 306 has been identified as a source location 330. The data path 320 out of the source location 330 flows through MUX 306, register 308, MUX 310, and register 312. The data propagation diagram 200 would thus be generated with a node 212 for the source location 330, a node 212 for the output of register 308, a node 212 for the output of register 312. The data propagation diagram 200 would also include edges 214 connecting these nodes 212 representing data propagation paths between the nodes 212. MUX 302 and register 304 are considered part of a control path 322 for source location 330 and are not used for generating the data propagation diagram 200.

In another embodiment, the diagram generation module 112 may not be provided with explicit source and destination locations. Instead, the diagram generation module 112 uses the input ports and output ports of the circuit design as the source and destination locations.

In a further embodiment, the diagram generation module 112 can leverage the signal trace 106 to refine and generate a more concise data propagation diagram 200. Using the trace analysis module 114, data locations without valid data in the activities captured by the signal trace 106 can be removed from the data propagation diagram 200. In other embodiment, the user can specify one or more data locations to be removed from the data propagation diagram 200. In doing so, the data may take multiple clock cycles to move from one node 212 to another node 212 in the data propagation diagram 200, and hence the trace analysis module 114 will need to analyze more logic between the nodes 212, and the animation module 116 may need to highlight data on the edge of the data propagation diagram 200 to indicate that data not stored in any data location in the nodes 212 of the data propagation diagram 200, but in some hidden data location not captured in the data propagation diagram 200 during those clock cycles.

Referring back to FIG. 1, the trace analysis module 114 receives the signal trace 106 and analyzes the signal trace 106 to determine whether data at one data location during a clock cycle is causally related to data at another data location during another clock cycle. Data at one location is causally related to data at another location if the data from one location is propagated into the other location. For example, suppose location A1 and location B1 are located along the same data propagation path. Data at location A1 during one clock cycle is causally related to the data at location B1 if the data at location A1 propagates forward in the circuit design into location B1. Additionally, in some embodiments the precise values of the propagating data may change from one location to another during the propagation due to logic gates (e.g. inverters, etc) located along the data propagation path between different data locations.

Whether data in one data location is causally related to data at another data location can be determined by evaluating the operation of the routing control circuits (e.g. MUX) that are located between the two data locations. The evaluation may be done using forward "because" analysis or backward "why" analysis to determine when and how data propagates through the circuit design, which are now explained in greater detail.

The trace analysis module 114 may use forward "because" propagation analysis to determine how data propagates through the circuit design. Given a data propagation diagram 200 and a signal trace 106, the forward propagation analysis can start with all possible source nodes (e.g. on the far left of data propagation diagram 200) to identify valid data at the source nodes for a given clock cycle. Once valid data is identified, the trace analysis module 114 works forward through the circuit design to discover when the valid data is propagated forward and where the valid data is propagated to during later clock cycles. Forward propagation analysis may discover a path for data whose final destination is within the logic between the source and destination locations, but never reaches the destination locations.

Figure 4A:
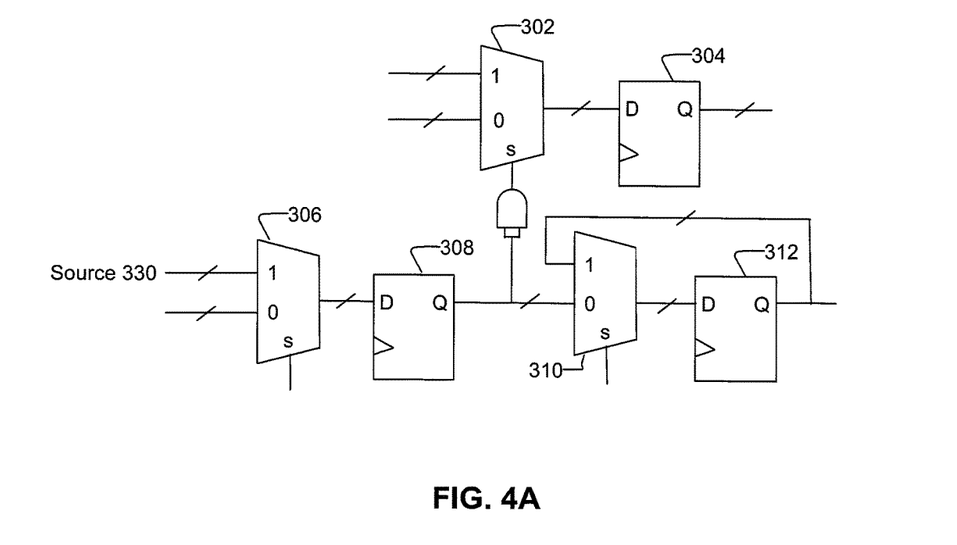
FIG. 4A illustrates an example of forward propagation analysis, according to an embodiment.

Referring to FIG. 4A, illustrated is an example of forward propagation analysis, according to an embodiment. FIG. 4A includes a portion of a circuit design that is similar to the portion of the circuit design shown in FIG. 3. The forward propagation analysis starts at the source location 330. If data is copied from a source location 330 during a given clock cycle, that data is considered to be valid. Thus, data at source location 330 is assumed to be valid whenever the selection control input of MUX 306 is "1" in the signal trace 106. Data at source location 330 is assumed to be invalid whenever the selection control input of MUX 306 is "0" in the signal trace 106. This is because the data at the source location 330 is only copied into register 308 when the select input is "1", otherwise the data at source location 330 is not used. Note that if the register 308 is configured with a slow clock and the clock is not ticking, the register 308 would not be copying the value at the input D into the register 380 and the output Q would not show the data, and the data at source 330 would not be considered valid. Also, when there are more logic between the source location and the first data location in the data propagation diagram 200, the analysis would be repeated for each gate in the logic, and the data is only considered valid if it makes it all the way to a data location corresponding to a node 212 in the data propagation diagram 200.

Next, once it is determined that the source location 330 has valid data, the data propagation path can be traced forwards to determine when and how the valid data is propagated and causes the valid data to appear at other locations in the circuit design. In general terms, given data locations A1 and A2 at the input to a MUX and a data location B1 at the output of the MUX, data can only move from location A1 to location B1 when the MUX select control input selects data location A1. The value of the MUX select input thus determines if data is being propagated forward through the MUX. For example, if valid data is currently in register 308, it is determined that the valid data moves towards register 312 when the selection control input of MUX 310 is a "0". Otherwise if the selection control input of MUX 310 is "1", it is determined that the valid data is being held in register 308 and is not propagated forward to register 312.

Alternatively, the trace analysis module 114 may use backward "why" propagation analysis to determine how data propagates through the circuit design. Given a data propagation diagram 200 and a signal trace 106, the backward propagation analysis can start with all possible destination nodes (e.g. on the far right of propagation diagram 200) to identify valid data at the destination nodes. Once valid data is identified, the backward analysis works backwards through the circuit design to discover where the valid data comes from. Backward propagation analysis may discover a path for data generated in logic between the source and destination locations that was not passed in through the source locations.

Figure 4B:
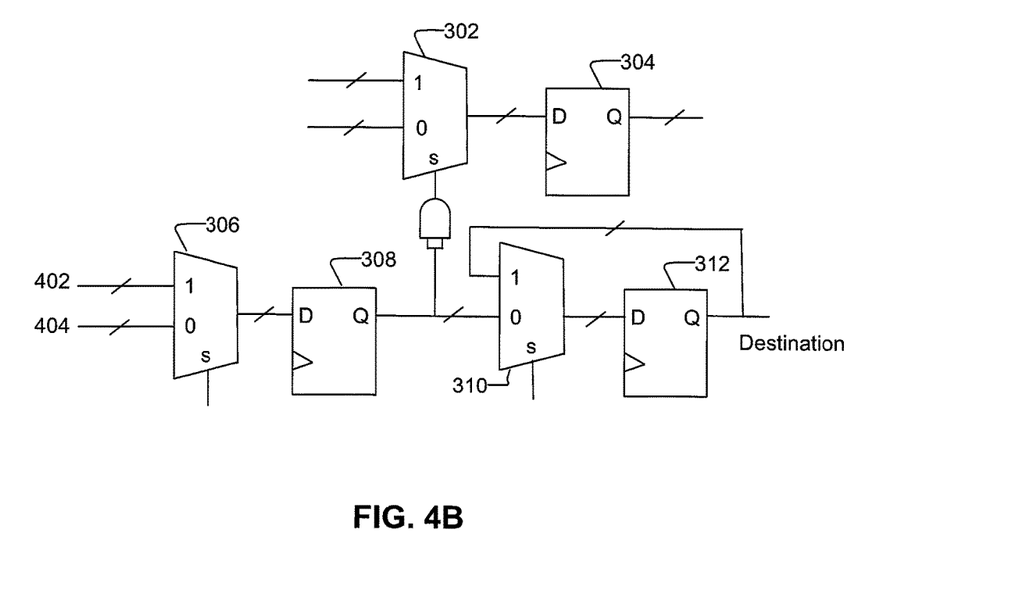
FIG. 4B illustrates an example of backward propagation analysis, according to an embodiment.

FIG. 4B illustrates an example of backward propagation analysis, according to an embodiment. FIG. 4B includes a portion of a circuit design that is similar to that shown in FIG. 3, according to an embodiment. The backward propagation analysis starts at the output of register 312, which also serves as the destination location. If data is copied into register 312 during a given clock cycle, the data in register 312 is considered to be valid. Thus, data at register 312 is assumed to be valid when the select input of MUX 310 is "0"

in the signal trace 106 for a given clock cycle. Data at register 312 is receiving its own data from the previous clock cycle when the select input of MUX 306 is "1" in the signal trace 106, and retains the validity from previous cycles if the data in register 312 was already valid (i.e. if the register 312 has valid data in the previous cycle, it now has a valid data as well; and if the register does not have valid data in the previous cycle, it does not contain a valid data now).

Next, once it is determined that the destination location has received valid data, the data propagation path can be traced backwards to determine how the valid data from other data locations propagated forward and caused the valid data to appear at the destination location. Tracing the data propagation path backwards is similar to tracing the data propagation path forwards, but is done in reverse. The value of a MUX select input that precedes a register determines where the data in that register came from. For example, if valid data is currently in register 312, and the value of the select signal for MUX 310 was "0" in the previous clock cycle, it is determined that the valid data was in register 308 in the previous clock cycle. Continuing with the example, now the valid data is in register 308. If the select signal for MUX 306 was "1" in the previously clock cycle, it is determined that the valid data came from input signal 402. On the other hand, if the select signal for MUX 406 was "0" in the previous clock cycle, it is determined that the valid data came from input signal 404.

In one embodiment, it is assumed that once data is copied of out a data location, the data in that location is no longer valid.

Given a signal trace 106 of N cycles, the propagation analysis is repeated for all source locations and all destination locations for all cycles, first checking if they contain valid data, then checking how the valid data are propagated through the different data locations captured in the nodes 212 of the data propagation diagram 200.

The animation module 116 generates visual animations for the data propagation diagram 200 if there is valid data at a data location that has a causal relationship to data at other data locations, as determined by the trace analysis module 14. The animations are displayed/presented on top of the data propagation diagram 200 and illustrate how data moves between one data location and another across the circuit design.

Figure 5A:
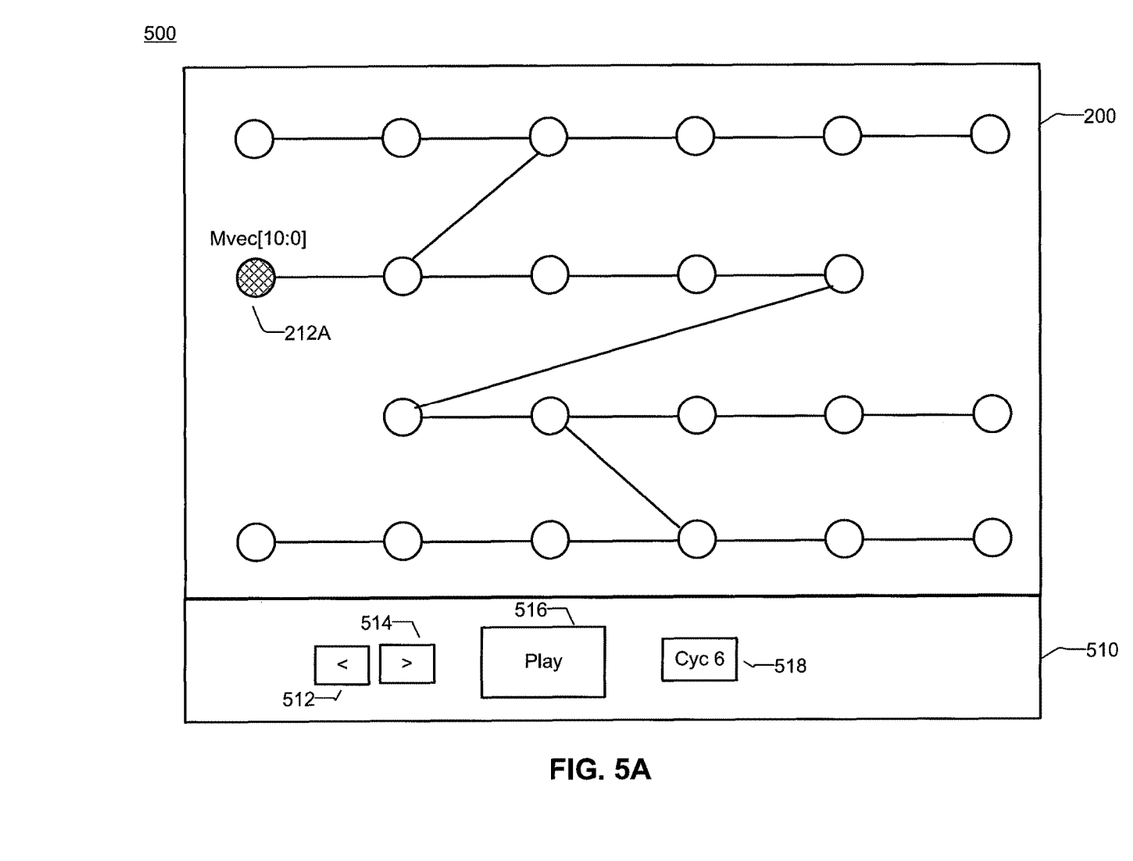
FIG. 5A-5C illustrate a user interface that includes data propagation animations, according to an embodiment.
Figure 5B:
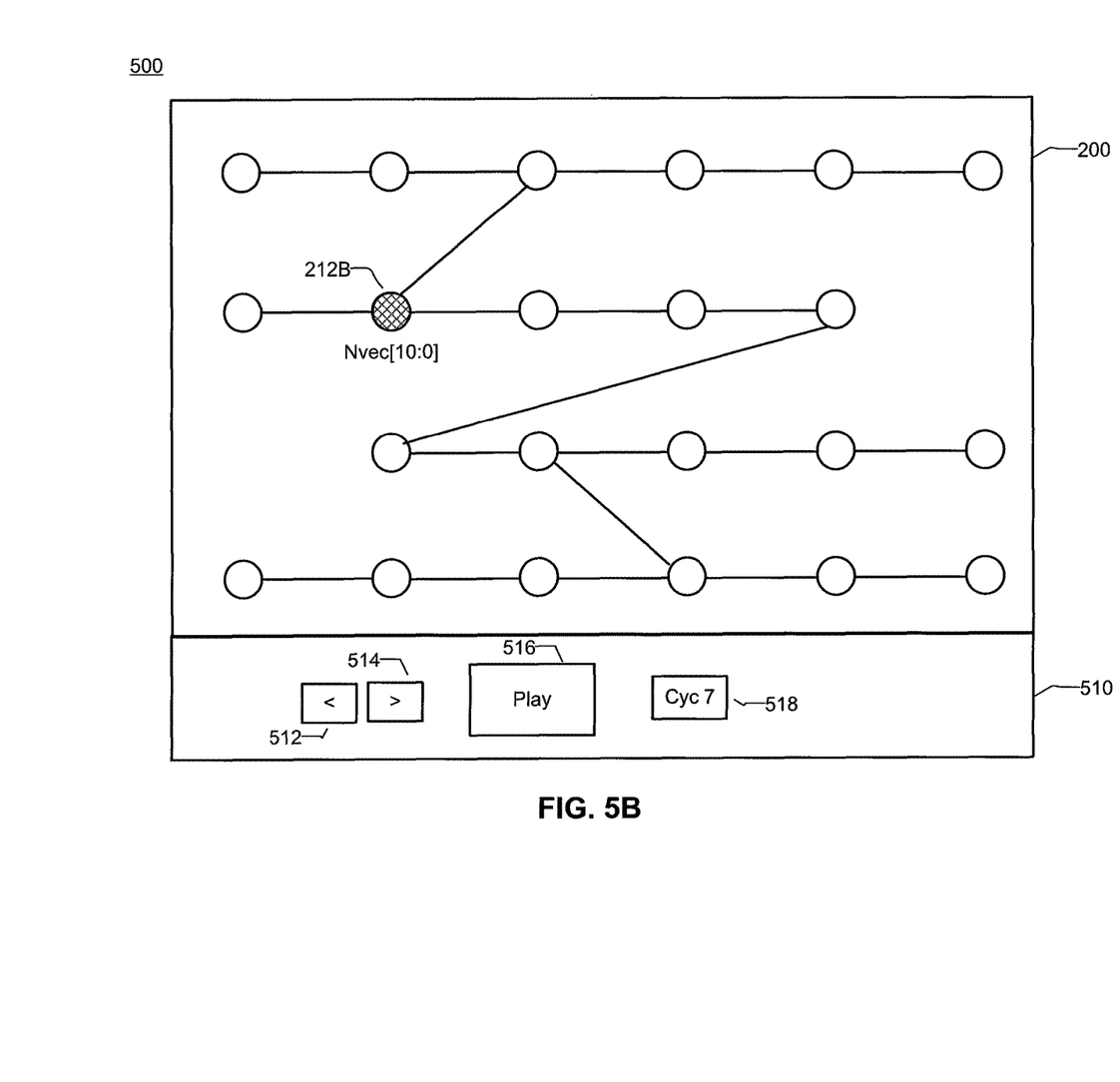
Figure 5C:
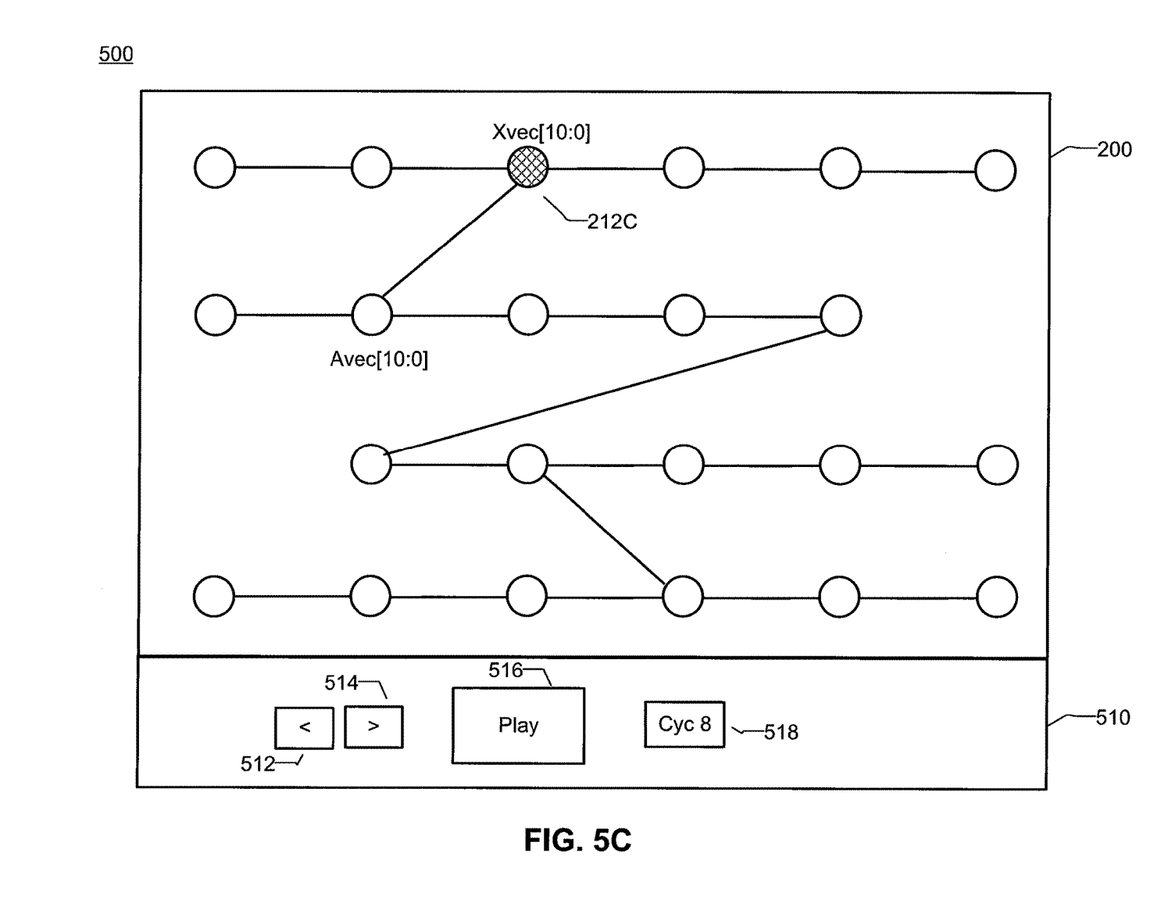

Referring now to FIG. 5A-5C, illustrated is a user interface 500 that includes data propagation animations, according to one embodiment. The user interface 500 includes a data propagation diagram 200 and interactive controls 510. The circuit designer can use the interactive controls 510 to control the flow of the animation. The interactive controls 502 include a button 512 to move the animation backward by one clock cycle, a button 514 to move the animation forward by one clock cycle, and a button 516 to play the animation in a continuous manner. The animation module 116 receives inputs from the user interacting with the interactive controls 502 and controls the flow of the animation in accordance with the user inputs. A clock display 518 also shows the current clock cycle being animated in the user interface 500.

FIG. 5A shows data propagation animations at clock cycle 6, FIG. 5B shows data propagation animations at clock cycle 7, and FIG. 5C shows data propagation animations at clock cycle 8. When FIGS. 5A, 5B, and 5C are displayed in sequence, the visual cues in the figures form a moving animation that shows the propagation of data during clock cycles 6 through 8 as the data moves from one location to another.

Referring to FIG. 5A, the clock display 518 indicates that the current clock cycle is 6. Node 212A is highlighted with a visual cue. Node 212A represents a data location "Mvec [10:0]" from the circuit design, and highlighting node 212A provides an indication that valid data is present at Mvec[10: 00] during clock cycle 6. The user then selects to advance the animation by selecting forward button 514.

Referring to FIG. 5B, after the user selects to advance the animation, the clock display 518 now indicates that the current clock cycle is 7. Node 212A is no longer highlighted with a visual cue because the valid data has propagated out of Mvec[10:0]. Instead, node 212B is highlighted with a visual cue. Node 212B represents a data location "Nvec[10: 0]" from the circuit design, and highlighting node 212B provides an indication that valid data is present at Nvec[10: 0] during clock cycle 7. The user then selects to advance the animation by selecting forward button 514.

Referring to FIG. 5C, after the user selects to advance the animation, the clock display 518 now indicates that the current clock cycle is 8. Node 212B is no longer highlighted with a visual cue because the valid data has propagated out of Nvec[10:0]. Instead, node 212C is highlighted with a visual cue. Node 212C represents a data location "Xvec[10: 0]" from the circuit design, and highlighting node 212C provides an indication that valid data is present at Xvec[10: 00] during clock cycle 8.

The animation can be played in forward mode, where the visual cues move from one cycle to the next cycle in a forward time dimension, thereby showing how data moves forwards in the circuit design. Alternatively, the animation can be played in backward mode where the visual cues move backwards from one cycle to the previous cycle in a backward time dimension, thereby showing where the data was before it reached the destination. The animation can be played in automatic mode, or can be stepped through one cycle at a time in response to a user input.

The simplified nature of the data propagation diagram 200 and the animations eliminates extraneous information that would otherwise distract the circuit designer, thereby only displaying information that is helpful to the circuit designer in debugging the circuit design. For example, the circuit designer can view the propagation of data to determine when data stops moving, which indicates that a deadlock condition is present.

Further, the resulting animations show causal relationships between different data locations in the circuit design that are not otherwise available from conventional debugging tools. If two pieces of incoming data have the exact same value D entering from input port A1 and port A2, and the trace eventually shows data value D coming out of output port B1 and B2, the resulting animations would be able to show the causal link between the incoming data at port A1 and A2 and the output data at port B1 and B2. For example, the animations may show that data from port A1 propagates to port B2. The animations may show that data from port A2 stops somewhere inside of the circuit design and never propagates to the output. The animations may also show that data output from port B1 was generated internally within the circuit design.

The visual cues in FIG. 5A-5C have an appearance that visually distinguishes a node 212 with valid data from other nodes 212 that dot not have valid data. The visual cues in FIG. 5A-5C are shown with cross-hatched shading. In other embodiments, the visual cues may have a different appearance than that shown in FIG. 5A-5C. For example, the visual cues may be shaded with a color that is different than the color of the data propagation diagram 200.

In one embodiment, the movement of different pieces of data from different source locations can be animated on the data propagation diagram 200 at the same time. For example, two different pieces of valid data can be shown entering the data propagation diagram 200 at two different locations at the same time. The visual cues for the two pieces of data can be different in color so as to not cause confusion when viewing the animation. For example, the visual cues for one piece of data can be displayed in green as the piece of data propagates across the data propagation diagram 200, and the visual cues for the other piece of data can be displayed in yellow as the other piece of data propagates across the data propagation diagram 200.

Figure 6A:
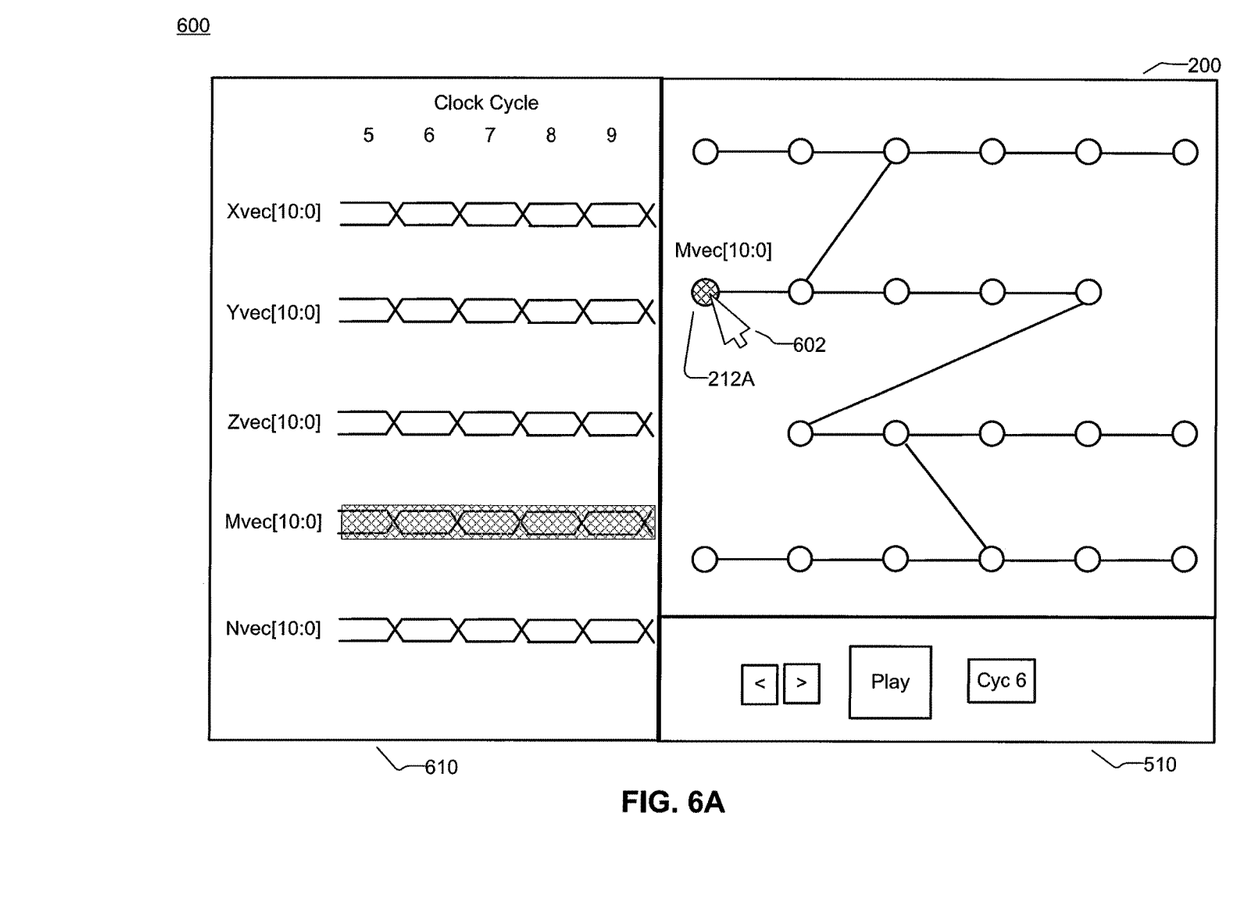
FIG. 6A-6B illustrate a user interface that includes separate regions for a data propagation diagram and a waveform, according to an embodiment.
Figure 6B:
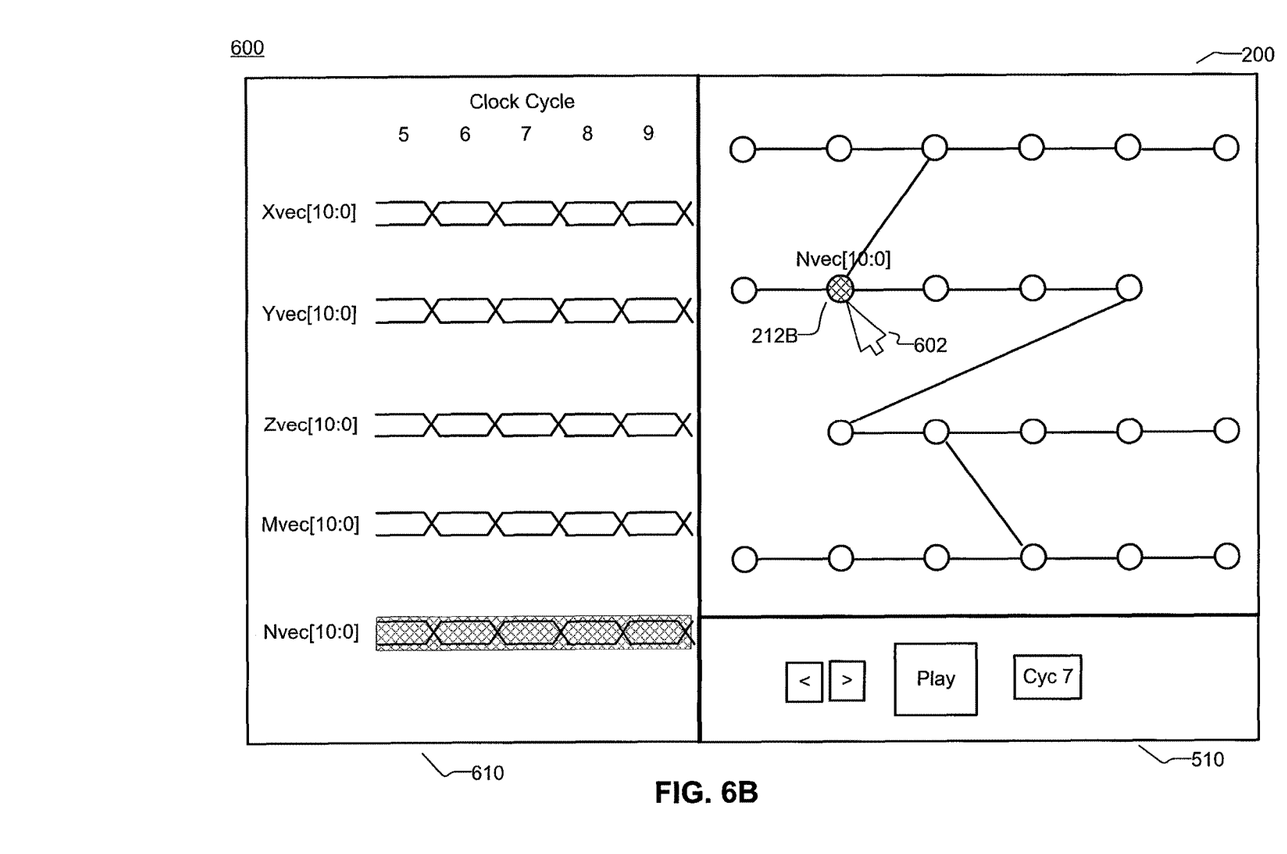

In one embodiment, the animation module 116 may present a waveform of the signal trace 106 in conjunction with the animations on the data propagation diagram 200. Referring now to FIG. 6A-6B, illustrated is a user interface 600 that includes separate regions for a data propagation diagram 200 and a waveform 610, according to one embodiment. The user interface 600 is similar to the user interface 500 of FIG. 5A-5C, but now includes a waveform 610 of the signal trace 106. The waveform indicates signal values for multi-bit signals Xvec[10:0], Yvec[10:0]. Zvec[10:0], Mvec [10:0] and Nvec[10:0] during clock cycles 5 through 9. The appearance of the waveform 610 is linked to the animations on the data propagation diagram 200. When visual cues are shown in the data propagation diagram 200, the corresponding signals for the visual cues are also highlighted in the waveform 610. If the signal is not already plotted in the waveform display, an embodiment of the invention may automatically add the signal to the waveform display.

Referring to FIG. 6A, the user interface 600 includes a data propagation diagram 200 next to a waveform 610. The visual cue on the data propagation diagram 200 indicates that Mvec[10:0] has valid data at clock cycle 6. The animation module 116 receives a user input selecting node 212A, which represents signal Mvec[10:0]. In response, the animation module 116 highlights the selected signal Mvec[10:0] in the waveform 610 with cross-hatching.

Referring to FIG. 6B, the visual cue on the data propagation diagram 200 now indicates that Nvec[10:0] has valid data at clock cycle 7. The animation module 116 receives a user input selecting node 212B, which represents signal Nvec[10:0]. In response, the animation module 116 highlights the selected signal Nvec[10:0] in the waveform 610 with cross-hatching.

Because the animations on the data propagation diagram 200 are linked to highlighting on the waveform 610, the circuit designer is provided with additional information to help the circuit designer understand how data is propagated within the circuit design. Highlighting on the waveform 600 can be done with shading, color, a visual box, bold text on a portion of the waveform 600, etc. The highlighting on the waveform 600 can match the appearance of the visual cues. Additionally, instead of highlighting an entire signal, only a specific cycle of the signal corresponding to the current clock cycle of the animation may be highlighted. For example, only clock cycle 7 of signal Nvec[10:0] may be highlighted in FIG. 6B because clock cycle 7 is currently being animated.

A further embodiment may provide control path analysis option as a context menu item of the signal Nvec[10:0] at cycle 7, such as adding the control path signals into the waveform display, allowing the combination of the data propagation diagram and the waveform display to complement each other to debug logics in both data path and control path.

Flowchart for Data Propagation Analysis

Figure 7:
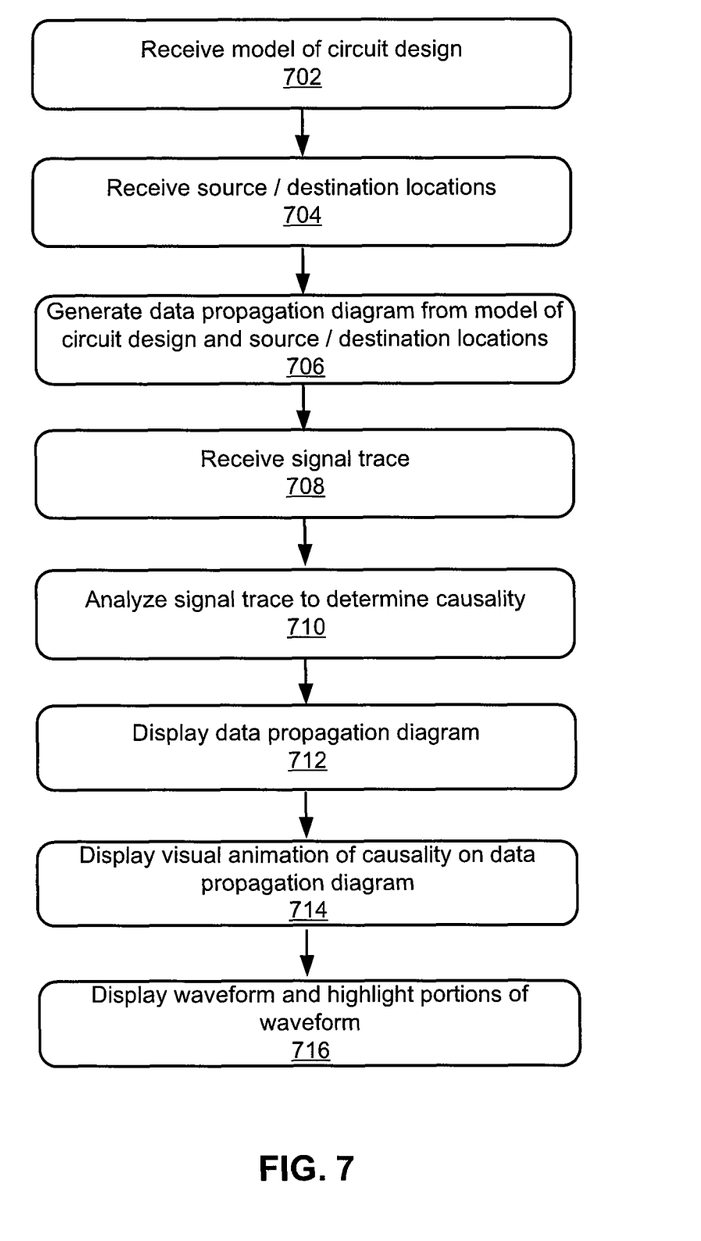
FIG. 7 is a flowchart of a method for data propagation analysis, according to one embodiment.

FIG. 7 is a flowchart of a method for data propagation analysis, according to one embodiment. In step 702, a model 104 of a circuit design is received. In step 704, source and destination locations are received. In step 706, a data propagation diagram 200 is generated from the model 104 of the circuit design and the source and destination locations. The data propagation diagram includes nodes representing data locations in the circuit design and edges representing data propagation paths between the data locations in the circuit design;

In step 708, a signal trace is received. In step 710, the signal trace is analyzed to determine whether data at a data location during a clock cycle is causally related to the data at another data location of the data locations during another clock cycle. The signal trace may use forward or backward analysis that relies on the value of a routing control signal for a routing control circuit (e.g. MUX) that is between the two data locations. This analysis may continue for multiple iterations in order to trace the propagation of the data across the circuit design between the source locations and the destination locations.

In step 712, the data propagation diagram 200 is displayed for viewing by a circuit designer. In step 714, if the data at two data locations are causally related, a visual animation of data propagation is displayed on the data propagation diagram 200. The visual animation indicates movement of the data between one node corresponding to one data location and another node corresponding to the other data location. The animation can be played forwards or backwards in response to a user input selecting the mode of animation.

Additionally, in step 716 a waveform 610 is displayed next to and at the same time as the data propagation diagram 200. The waveform 610 is linked to data propagation diagram 200 such that portions of the waveform 610 corresponding to the animations are highlighted.

SUMMARY

The foregoing description of the disclosed embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the disclosed embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code including instructions, which can be executed by a computer processor for performing any or all of the steps, operations, or processes described.

The disclosed embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the disclosure, which is set forth in the following claims.

What is claimed is:

1. A computer-implemented method for debugging a circuit design with a data propagation analysis, comprising:
   identifying a plurality of circuit component designs in a circuit design;
   reducing, at a plurality of modules stored at least partially in memory of and functioning in conjunction with at least one microprocessor of one or more computing systems, the plurality of circuit component designs into a reduced set of circuit component designs representing data locations in the circuit design at least by omitting one or more circuit component designs from the circuit design;
   generating, at a diagram generation module in the plurality of modules, a data propagation diagram for the circuit design for representing the reduced set of circuit component designs as a plurality of nodes, the data propagation diagram including a plurality of edges connecting the plurality of nodes;
   analyzing, at the plurality of modules, a signal trace specifying at least one signal value for the circuit design to determine whether data at a first data location of the data locations during a first clock cycle is causally related to the data at a second data location of the data locations during a second clock cycle; and
   in response to determining that the data at the first data location is causally related to the data at the second data location, executing an animation module of the plurality of modules that generates and displays a visual animation on the data propagation diagram in the user interface indicating movement of the data between a first node of the plurality of nodes corresponding to the first data location and a second node of the plurality of nodes corresponding to the second data location.

2. The method of claim 1, further comprising:
   receiving a plurality of source locations and a plurality of destination locations in the circuit design,
   wherein the data propagation diagram is generated based on the plurality of source locations and the plurality of destination locations.

3. The method of claim 1, wherein analyzing the signal trace comprises:
   identifying, based on the signal trace for the circuit design, the first data location of the data locations having the data during the first clock cycle; and
   determining, based on the signal trace for the circuit design, whether the data at the first data location of the data locations during the first clock cycle is causally related to the data at the second data location of the data locations during the second clock cycle.

4. The method of claim 3, wherein the first data location and the second data location are separated by a routing control circuit controlled by a control input, and determining whether the data at the first data location during the first clock cycle is causally related to the data at the second data location comprises:
   determining, based on a value of the control input in the signal trace, whether the data at the first data location is causally related to the data at a second data location of the data locations during the second clock cycle.

5. The method of claim 1, wherein the first clock cycle is before the second clock cycle, and analyzing the signal trace comprises:
   analyzing the signal trace to determine whether the data at the first data location causes the data at the second data location.

6. The method of claim 1, wherein the second clock cycle is before the first clock cycle, and analyzing the signal trace comprises:
   analyzing the signal trace to determine whether the data at the first data location is caused by the data at the second data location.

7. The method of claim 1, wherein displaying the visual animation comprises displaying a forward visual animation indicating movement of the data in a forward time dimension.

8. The method of claim 1, wherein displaying the visual animation comprises displaying a backward visual animation indicating movement of the data in a backward time dimension.

9. The method of claim 1, wherein displaying the visual animation comprises:
   displaying a first visual cue on the data propagation diagram highlighting the first node of the data propagation diagram corresponding to the first data location of the circuit design; and
   after displaying the first visual cue, displaying a second visual cue on the data propagation diagram highlighting the second node of the data propagation diagram corresponding to the second data location of the circuit design.

10. The method of claim 1, further comprising:
    displaying a waveform of the trace in conjunction with the visual animation indicating movement of the data between the first node of the plurality of nodes corresponding to the first data location and the second node of the plurality of nodes corresponding to the second data location; and
    highlighting one or more portions of the waveform that correspond to the visual animation indicating movement of the data between the first node of the plurality of nodes corresponding to the first data location and the second node of the plurality of nodes corresponding to the second data location.

11. A non-transitory computer readable medium storing code for circuit design analysis, the code comprising instructions for:
    identifying a plurality of circuit component designs in a circuit design;

reducing, at a plurality of modules stored at least partially in memory of and functioning in conjunction with at least one microprocessor of one or more computing systems, the plurality of circuit component designs into a reduced set of circuit component designs representing data locations in the circuit design at least by omitting one or more circuit component designs from the circuit design;

generating, at a diagram generation module in the plurality of modules, a data propagation diagram for the circuit design for representing the reduced set of circuit component designs as a plurality of nodes, the data propagation diagram including a plurality of edges connecting the plurality of nodes;

analyzing, at the plurality of modules, a signal trace specifying at least one signal value for the circuit design to determine whether data at a first data location of the data locations during a first clock cycle is causally related to the data at a second data location of the data locations during a second clock cycle; and in response to determining that the data at the first data location is causally related to the data at the second data location, executing an animation module of the plurality of modules that generates and displays a visual animation on the data propagation diagram in the user interface indicating movement of the data between a first node of the plurality of nodes corresponding to the first data location and a second node of the plurality of nodes corresponding to the second data location.

12. The computer readable medium of claim 11, the code comprising further instructions for:

receiving a plurality of source locations and a plurality of destination locations in the circuit design,
wherein the data propagation diagram is generated based on the plurality of source locations and the plurality of destination locations.

13. The computer readable medium of claim 11, wherein analyzing the signal trace comprises:

identifying, based on the signal trace for the circuit design, first data location of the data locations having the data during the first clock cycle; and determining, based on the signal trace for the circuit design, whether the data at the first data location of the data locations during the first clock cycle is causally related to the data at the second data location of the data locations during the second clock cycle.

14. The computer readable medium of claim 13, wherein the first data location and the second data location are separated by a routing control circuit controlled by a control input, and determining whether the data at the first data location during the first clock cycle is causally related to the data at the second data location comprises:

determining, based on a value of the control input in the signal trace, whether the data at the first data location is causally related to the data at a second data location of the data locations during the second clock cycle.

15. The computer readable medium of claim 11, wherein the first clock cycle is before the second clock cycle, and analyzing the signal trace comprises:

analyzing the signal trace to determine whether the data at the first data location causes the data at the second data location.

16. The computer readable medium of claim 11, wherein the second clock cycle is before the first clock cycle, and analyzing the signal trace comprises:

analyzing the signal trace to determine whether the data at the first data location is caused by the data at the second data location.

17. The computer readable medium of claim 11, wherein displaying the visual animation comprises displaying a forward visual animation indicating movement of the data in a forward time dimension.

18. The computer readable medium of claim 11, wherein displaying the visual animation comprises displaying a backward visual animation indicating movement of the data in a backward time dimension.

19. The computer readable medium of claim 11, wherein displaying the visual animation comprises:

displaying a first visual cue on the data propagation diagram highlighting the first node of the data propagation diagram corresponding to the first data location of the circuit design; and after displaying the first visual cue, displaying a second visual cue on the data propagation diagram highlighting the second node of the data propagation diagram corresponding to the second data location of the circuit design.

20. The computer readable medium of claim 11, the code comprising further instructions for:

displaying a waveform of the trace in conjunction with the visual animation indicating movement of the data between the first node of the plurality of nodes corresponding to the first data location and the second node of the plurality of nodes corresponding to the second data location; and highlighting one or more portions of the waveform that correspond to the visual animation indicating movement of the data between the first node of the plurality of nodes corresponding to the first data location and the second node of the plurality of nodes corresponding to the second data location.

* * * * *